(12) United States Patent
Sherman

(10) Patent No.: US 8,340,795 B2
(45) Date of Patent: Dec. 25, 2012

(54) SMALL REMOVABLE AUDIO PLAYER THAT ATTACHES TO A HOST MEDIA PLAYER

(75) Inventor: Itay Sherman, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 1182 days.

(21) Appl. No.: 11/827,701

(22) Filed: Jul. 13, 2007

(65) Prior Publication Data

US 2008/0243279 A1 Oct. 2, 2008

Related U.S. Application Data

(60) Provisional application No. 60/920,037, filed on Mar. 26, 2007.

(51) Int. Cl.
*G06F 17/00* (2006.01)
(52) U.S. Cl. .......... 700/94; 715/716; 715/727; 715/728; 726/27
(58) Field of Classification Search .................. 381/119; 700/94; 707/6, 10, 104.1, 101, 205; 715/229, 715/203, 744, 745, 748, 771, 716, 727–728; 710/16; 726/27
See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |
| 6,493,782 B1 * | 12/2002 | Verdun et al. ................. 710/300 |

(Continued)

FOREIGN PATENT DOCUMENTS

EP 1871075 A1 12/2007

(Continued)

*Primary Examiner* — Disler Paul
(74) *Attorney, Agent, or Firm* — Soquel Group LLC

(57) ABSTRACT

A media player, including a host player, including a host media playing module for playing digital media files, a host storage unit for storing digital media files, a host battery for supplying power to the host player, a host controller for storing incoming media files in the host storage unit, a host display unit, and at least one host user interface control for user command input to navigate and play the digital media files stored in the host storage unit, and a removable player which can be attached to the host player and detached from the host player, and which is operative to play digital audio files when it is attached to the host player and when it is detached from the host player, including an audio playing module, a storage unit for storing digital media files, a wireless modem for receiving digital media files from remote sources, a battery for supplying power to the removable player, which is charged by the host battery when the removable player is attached to the host player, and a controller for storing incoming media files in the removable player storage unit and for selectively copying media files from the removable player storage unit to the host storage unit when the removable player is attached to the host player, wherein the host controller selectively copies media files from the host storage unit to the removable player storage unit when the removable player is attached to the host player. A method is also described and claimed.

12 Claims, 5 Drawing Sheets

U.S. PATENT DOCUMENTS

| | | | |
|---|---|---|---|
| 6,516,202 B1 | 2/2003 | Hawkins et al. | |
| 6,640,113 B1 | 10/2003 | Shin et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,593,782 B2 * | 9/2009 | Jobs et al. | 700/94 |
| 2002/0090980 A1 | 7/2002 | Wilcox et al. | |
| 2002/0151327 A1 | 10/2002 | Levitt | |
| 2003/0167449 A1 * | 9/2003 | Warren et al. | 715/531 |
| 2004/0078357 A1 * | 4/2004 | LaChapelle et al. | 707/2 |
| 2004/0233930 A1 | 11/2004 | Colby, Jr. | |
| 2004/0268005 A1 | 12/2004 | Dickie | |
| 2005/0070225 A1 | 3/2005 | Lee | |
| 2005/0159184 A1 | 7/2005 | Kerner et al. | |
| 2006/0003804 A1 | 1/2006 | Liu | |
| 2006/0105722 A1 | 5/2006 | Kumar | |
| 2006/0224620 A1 * | 10/2006 | Silverman et al. | 707/104.1 |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0078548 A1 * | 4/2007 | May et al. | 700/94 |
| 2007/0079030 A1 | 4/2007 | Okuley et al. | |
| 2007/0161404 A1 | 7/2007 | Yasujima et al. | |
| 2007/0201705 A1 * | 8/2007 | Dorogusker et al. | 381/104 |
| 2007/0288583 A1 | 12/2007 | Rensin et al. | |
| 2008/0009325 A1 | 1/2008 | Zinn et al. | |
| 2008/0026794 A1 | 1/2008 | Warren | |
| 2008/0040354 A1 | 2/2008 | Ray et al. | |
| 2008/0140886 A1 | 6/2008 | Izutsu | |
| 2008/0168245 A1 * | 7/2008 | De Atley et al. | 711/162 |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

SMALL REMOVABLE AUDIO PLAYER THAT ATTACHES TO A HOST MEDIA PLAYER

PRIORITY REFERENCE TO RELATED APPLICATIONS

This application claims benefit of U.S. Provisional Application No. 60/920,037, entitled SYNCHRONIZED MEDIA PLAYERS WITHIN A SINGLE HOUSING, filed on Mar. 26, 2007 by inventor Itay Sherman.

FIELD OF THE INVENTION

The present invention relates to digital media players.

BACKGROUND OF THE INVENTION

Today, media players with a variety of capabilities are available. Larger top-of-the-line players, such as the iPod® manufactured by Apple, Inc. of Cupertino, Calif., have large memories, include a speaker and a color video display for output, and various input controls, such as buttons and jog dials, for command input. Smaller MP3 players, such as the iPod Shuffle, also manufactured by Apple, Inc., have smaller memories, do not have color video displays and include only limited controls for command input.

Often users would like to have a large media player in certain situations, such as when they are in an airplane or in a hotel room, and a small MP3 player in other situations, such as when they are jogging or hiking. To this end, users may purchase two players, a larger player and a small player, but then they are faced with the constant task of independently synchronizing the players with their music of choice. Using prior art technology, synchronizing the players requires the medium of a desktop or laptop personal computer. The iTunes® software, distributed by Apple, Inc., for example, may be used to synchronize two iPod players via a personal computer.

SUMMARY OF THE DESCRIPTION

The present invention overcomes drawbacks of maintaining two separate digital media players, and provides players that attach one to another. More specifically, the present invention includes a portable host digital media player (referred to herein as the "host" or the "host player") with a small removable audio player (referred to herein as the "removable player") that attaches thereto. Both players have memories for storing digital files, and the host's controller or the removable audio player's controller, or both controllers, are able to automatically or manually synchronize files stored in the two memories.

The host player has its own battery, its own non-volatile memory for storing media files, and its own controller. The host player generally includes a display, and includes user interface controls to organize, select, play and view metadata for songs or video files.

The removable player may be hosted by the host player. The removable player is also a standalone audio player, but with limited features in comparison to the host player. The removable player includes its own battery sub-system, its own removable non-volatile memory for storing digital audio files, and its own controller. The removable player also includes a wireless modem, including inter alia a cellular modem, a WLAN modem or a WiMax modem, which enables download of digital media files from remote sources. The removable player generally does not have its own display, and generally has a limited user interface to play a song, to advance to a next song, and to return to the beginning of a song.

The removable player is used in circumstances where it is convenient for a user to handle a small player. When a user is jogging, for example, it is easier for him to carry a small player.

The media files played by either player may be obtained via the host's connection to remote media sources, via physical USB or SD connection, or via wireless connection. The media files may also be obtained via the removable player's wireless modem connection. Media files obtained via the removable player's wireless modem may be transferred to the host player. As such, the removable player may be used to download files intended for the host player, such as video files, which generally cannot be played on the removable player.

In one embodiment of the present invention the host controller synchronizes the media files stored on the host player and the removable player. In another embodiment of the present invention, the removable player's controller synchronizes the media files stored on the host player and the removable player. Synchronization of media files is based primarily on the media formats that each player supports. Generally, the removable player supports only audio formats, such as MP3 formats, where the host player supports also video formats, such as MP4 formats. As such, when the two players interact to synchronize their respective memories, only files supported by each player are stored in the player.

Additionally, synchronization is governed by user preferences. For example, a user may specify that those songs which are most often played or most recently played, or which have high rankings, are to be shared on both players.

There is thus provided in accordance with an embodiment of the present invention a media player, including a host player, including a host media playing module for playing digital media files, a host storage unit for storing digital media files, a host battery for supplying power to the host player, a host controller for storing incoming media files in the host storage unit, a host display unit, and at least one host user interface control for user command input to navigate and play the digital media files stored in the host storage unit, and a removable player which can be attached to the host player and detached from the host player, and which is operative to play digital audio files when it is attached to the host player and when it is detached from the host player, including an audio playing module, a storage unit for storing digital media files, a wireless modem for receiving digital media files from remote sources, a battery for supplying power to the removable player, which is charged by the host battery when the removable player is attached to the host player, and a controller for storing incoming media files in the removable player storage unit and for selectively copying media files from the removable player storage unit to the host storage unit when the removable player is attached to the host player, wherein the host controller selectively copies media files from the host storage unit to the removable player storage unit when the removable player is attached to the host player.

There is additionally provided in accordance with an embodiment of the present invention a method for synchronizing a host media player and a removable audio player, when the removable audio player is attached to the host media player, including receiving a new media file via an external connector in the host media player, wherein the new media file may be a digital audio file or a digital video file, storing the new media file in a storage unit within the host media player, and conditionally copying the new media file to a storage unit within the removable audio player when the removable audio player is attached to the host media player, if the new media file is an audio file.

BRIEF DESCRIPTION OF THE DRAWINGS

The present invention will be more fully understood and appreciated from the following detailed description, taken in conjunction with the drawings in which.

DETAILED DESCRIPTION

Figure 1A:
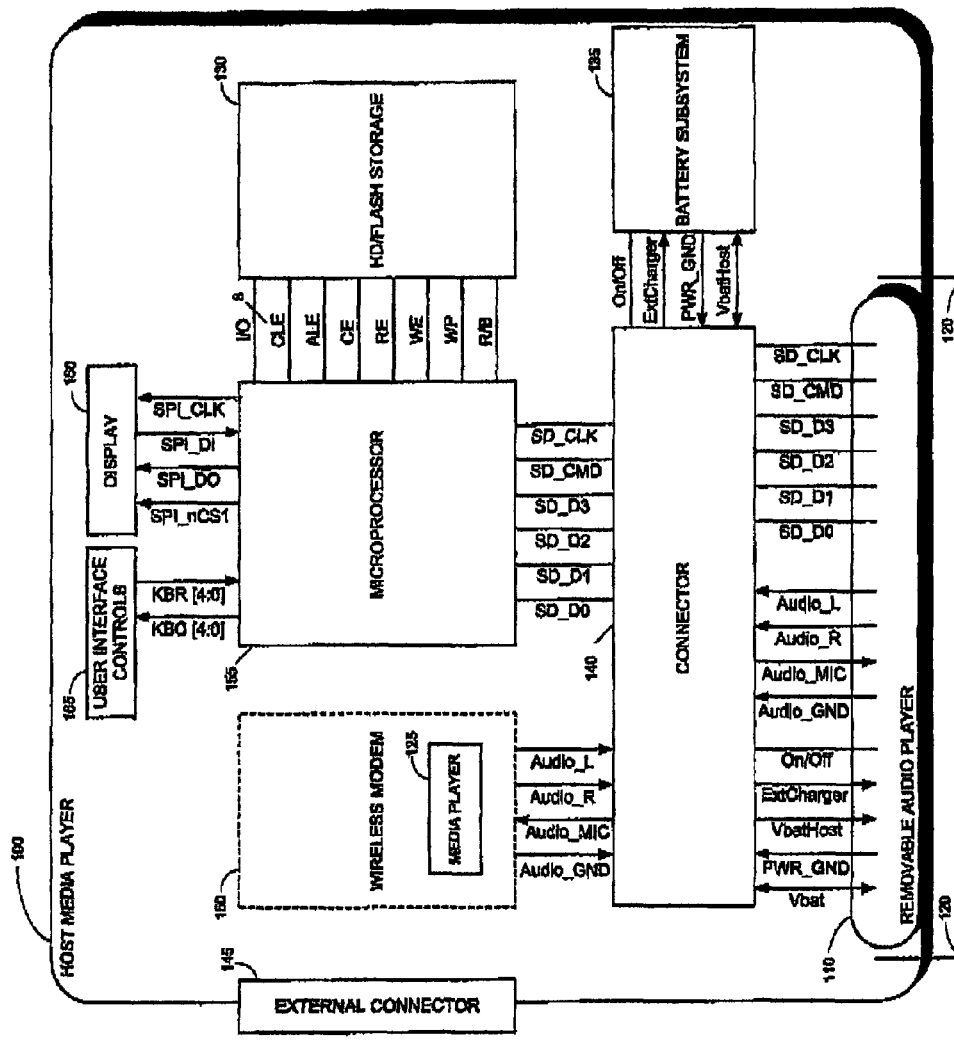
FIG. 1 is a simplified block diagram of a digital audio player attached to a digital media player, in accordance with an embodiment of the present invention.
Figure 1B:
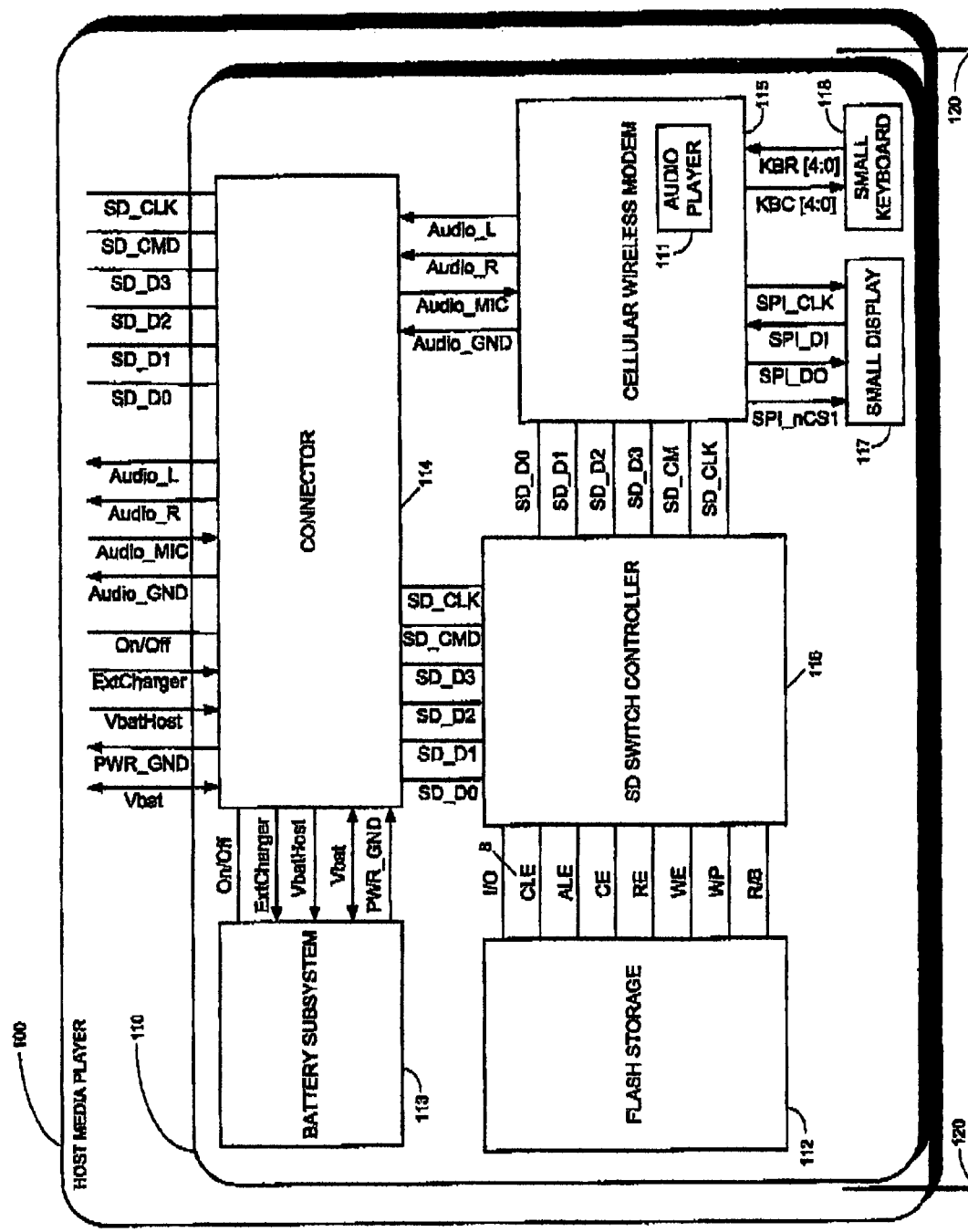

The present invention relates to a digital audio player that attaches to a digital media player, such as an MP3 player that attaches to an MP3/MP4 player. Reference is now made to FIG. 1, which is a simplified block diagram of a digital audio player attached to a digital media player, in accordance with an embodiment of the present invention. Shown in FIG. 1 are a host media player 100 and a removable audio player 110. Removable audio player 110 can be attached or detached from host media player 100. Removable audio player 110 slides in and out of host media player 110 along tracks 120. Host media player 100 and removable audio player 110 are operative to play songs stored in digital audio files. Host player 100 is also operative to play video files.

Host media player 100 includes a player module 125. Host player 100 also includes a storage unit 130, which is generally HD or flash memory, for storing digital media files. Host media player 100 also includes a battery subsystem 135 for powering player module 125.

Removable audio player 110 includes a player module 111. Removable audio player 110 also includes a storage unit 112, which is generally a built-in flash memory such as NAND flash or a detachable memory card such as an SD card, or both, for storing digital audio files.

Removable audio player 110 is powered by a battery subsystem 113 that includes a small removable battery. Battery subsystem 113 is charged by battery subsystem 135, when removable audio player 110 is attached to host player 100. When removable audio player 110 is detached from host player 110, it is powered by battery subsystem 113, until the stored charge in battery subsystem 113 is exhausted. Battery subsystem 113 may also be charged from an external power source, via a charger, or via a USB connection.

Special connectors 140 and 114 are used to transfer data and power between host media player 100 and removable audio player 110, respectively.

Incoming data may be transferred to host media player 100 via an external connector 145, such as a USB port or an SD connector, or both. Host media player 100 may optionally include a wireless modem 150, through which data is received from remote sources.

Removable audio player 110 includes a wireless modem 115, which is generally a cellular modem.

Host player 100 includes a microprocessor controller 155, and removable audio player 110 includes an SD switch controller 116. Controllers 155 and 116 are operative to store incoming digital files on either or both of host memory 130 and removable player memory 112, automatically or manually as instructed by a user. Synchronization of files between the host media player 100 and removable audio player 110 is described hereinbelow with respect to FIGS. 2 and 3.

Host media player 100 is large enough to include a display 160, for displaying command menus and song metadata to a user, and for displaying videos. Host media player 100 also includes user interface controls 165, for organizing, playing and selecting media files. User interface controls 165 also enable a user to manage files stored in host memory 130 and removable player memory 112. User interface controls 165 enable a user to select to which or both of memories 130 and 112 incoming files are to be saved. User interface controls 165 also enable a user to add and delete files from memories 130 and 112, and to copy media files from one memory to another.

As distinct from host media player 100, removable audio player 100 may not have a display at all, or may have a simple LCD display 117. Removable audio player includes limited user interface controls via a small keyboard 118. Keyboard 118 enables a user to perform basic functions, including inter alia playing a song, advancing to a next song, and returning to the beginning of a song.

Host media player 100 may or may not be operative to play media when removable player 110 is detached therefrom.

It will be appreciated by those skilled in the art that the configuration illustrated in FIG. 1 is but one of many possible implementations of the present invention, and that the various components in FIG. 1 may be positioned and inter-connected differently than the specific configuration illustrated in FIG. 1, within the scope of the present invention.

Figure 2:
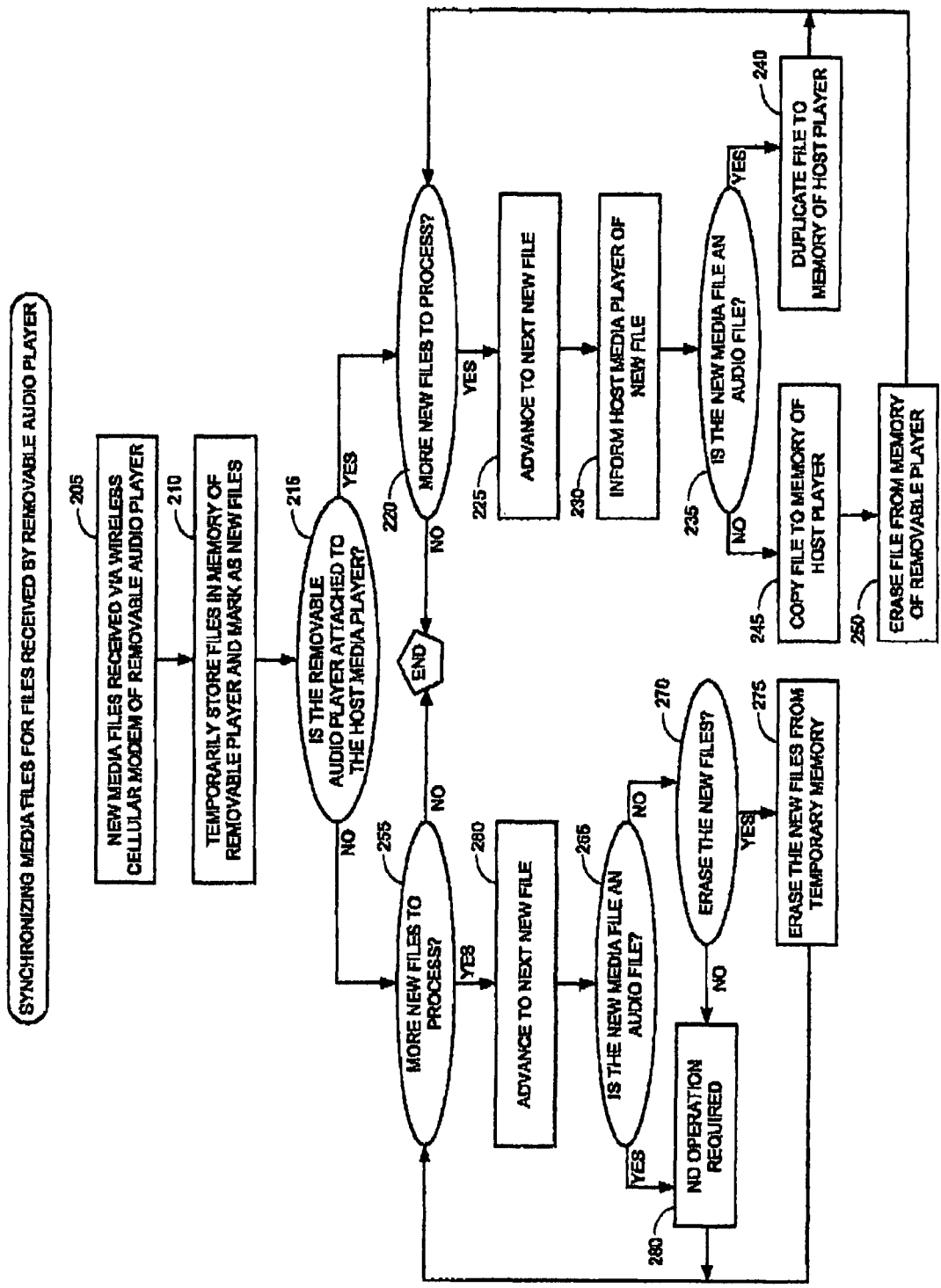
FIG. 2 is a simplified flowchart of a method for synchronizing media files between a host media player and a removable audio player, when the media files are received by the removable player, in accordance with an embodiment of the present invention.

Reference is now made to FIG. 2, which is a simplified flowchart of a method for synchronizing media files between host media player 100 and removable audio player 110, when the media files are received by removable player 110, in accordance with an embodiment of the present invention. At step 205 new media files are downloaded via cellular wireless modem 115 of removable audio player 110. At step 210 the files are stored in a temporary allocated memory of storage 112, and marked as new files. The new files are classified as being audio files or other files.

At step 215 a determination is made whether or not removable audio player 110 is currently attached to host media player 100. If so, then at step 220 a determination is made whether there are more new files to process. If so, then at step 225 processing advances to the next new file. At step 230 a message is sent to host media player 100, indicating that there is a media update. At step 235 a determination is made whether the new file currently being processed is an audio file. If so, then at step 240 a duplicate copy of the file is written to storage 130 of host media player 100. Processing then advances to step 220, to process the next file. If all of the new files have already been processed, then the synchronization ends. If the new file currently being processed is not an audio file, as determined at step 235, then at step 245 the file is copied to storage 130 of host media player 100, and at step 250 the new file is erased from storage 112. Processing then advances to step 220.

If removable audio player 110 is not currently attached to host media player 100, as determined at step 215, then at step 255 a determination is made whether there are more new files to process. If so, then at step 260 processing advances to the next new file. At step 265 a determination is made whether the new file currently being processed is an audio file. If not, then at step 270 a determination is made, generally based on user preferences, whether or not to erase the new file from storage 112 or else to keep the new file in storage 112 until removable player 110 is subsequently attached to host player 100. If so, then at step 275 the new file is erased. Otherwise, at step 280 no operation is required. Processing then advances to step 255, to process the next file. If the new file currently being processed is an audio file, as determined at step 265, then at step 280 no operation is required. When removable audio player 110 is subsequently attached to host media player 100, the new audio files in storage 112 may be transferred to host storage 130. Processing then advances to step 255.

Figure 3:
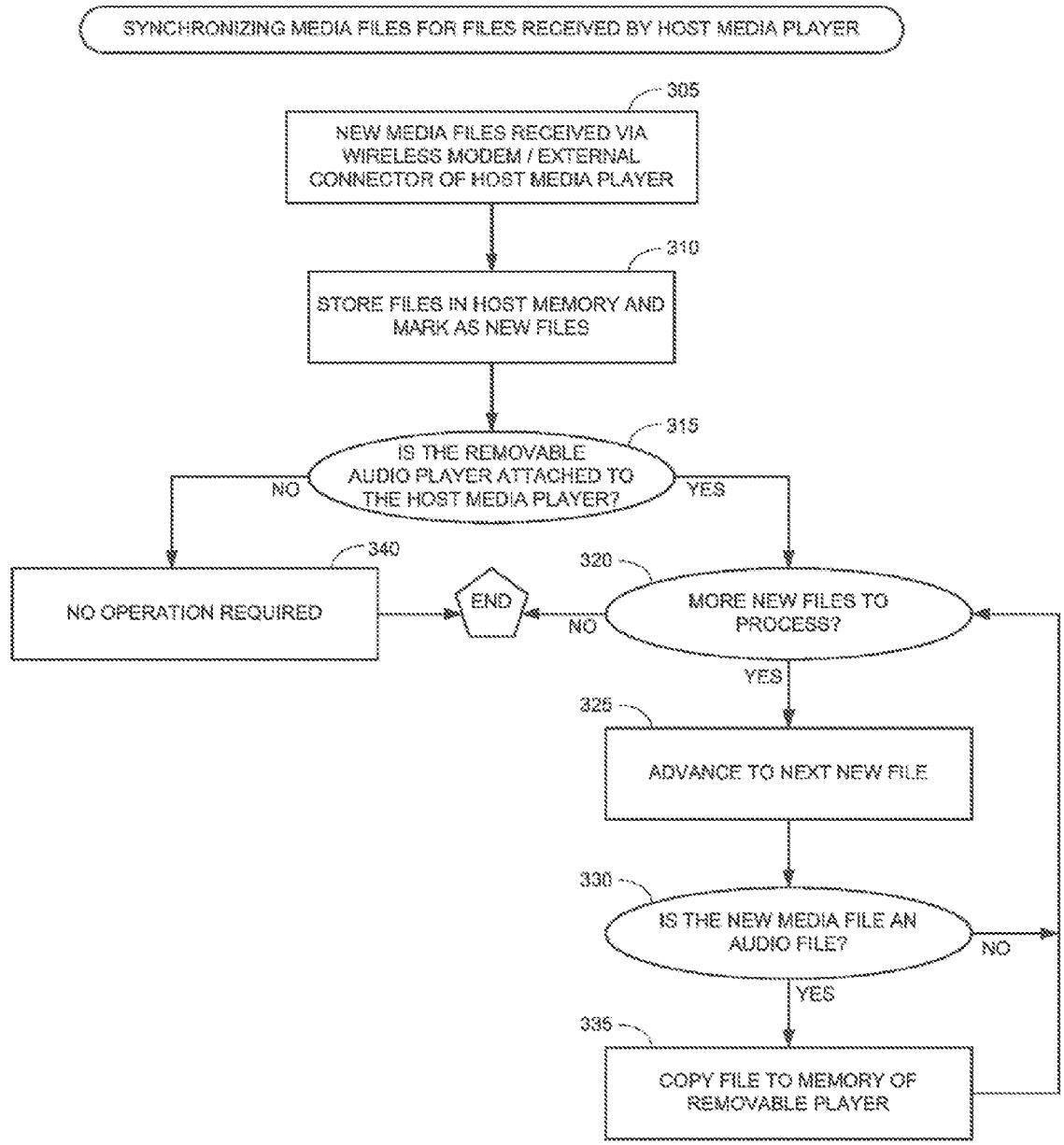
FIG. 3 is a simplified flowchart of a method for synchronizing media files between a host media player and a removable audio player, when the media files are received by the host player, in accordance with an embodiment of the present invention.

Reference is now made to FIG. 3, which is a simplified flowchart of a method for synchronizing media files between host media player 100 and removable audio player 110, when the media files are received by host player 100, in accordance with an embodiment of the present invention. At step 305 new media files are received by host media player 100, via wireless modem 150 or external connector 145. At step 310 the files are stored in host memory 130 and marked as new files. The new files are classified as being audio files or other files.

At step 315 a determination is made whether removable audio player 110 is currently attached to host media player 100. If so, then at step 320 a determination is made whether there are more new media files to process. If so, processing advances to the next new media file at step 325. At step 330 a determination is made whether the new media file currently being processed is an audio file. If so, then at step 335 the new file is copied to storage 112. Processing then advances to step 320, to process the next new file. If all of the new files have been processed, then the synchronization ends. If the new file currently being processed is not an audio file, as determined at step 330, then processing advances directly to step 320.

If removable audio player 110 is not currently attached to host media player 100, as determined at step 315, then at step 340 no operation is required, and the new files may be transferred to removable audio player 110 when it is subsequently attached to host media player 100. The synchronization then ends.

Figure 4:
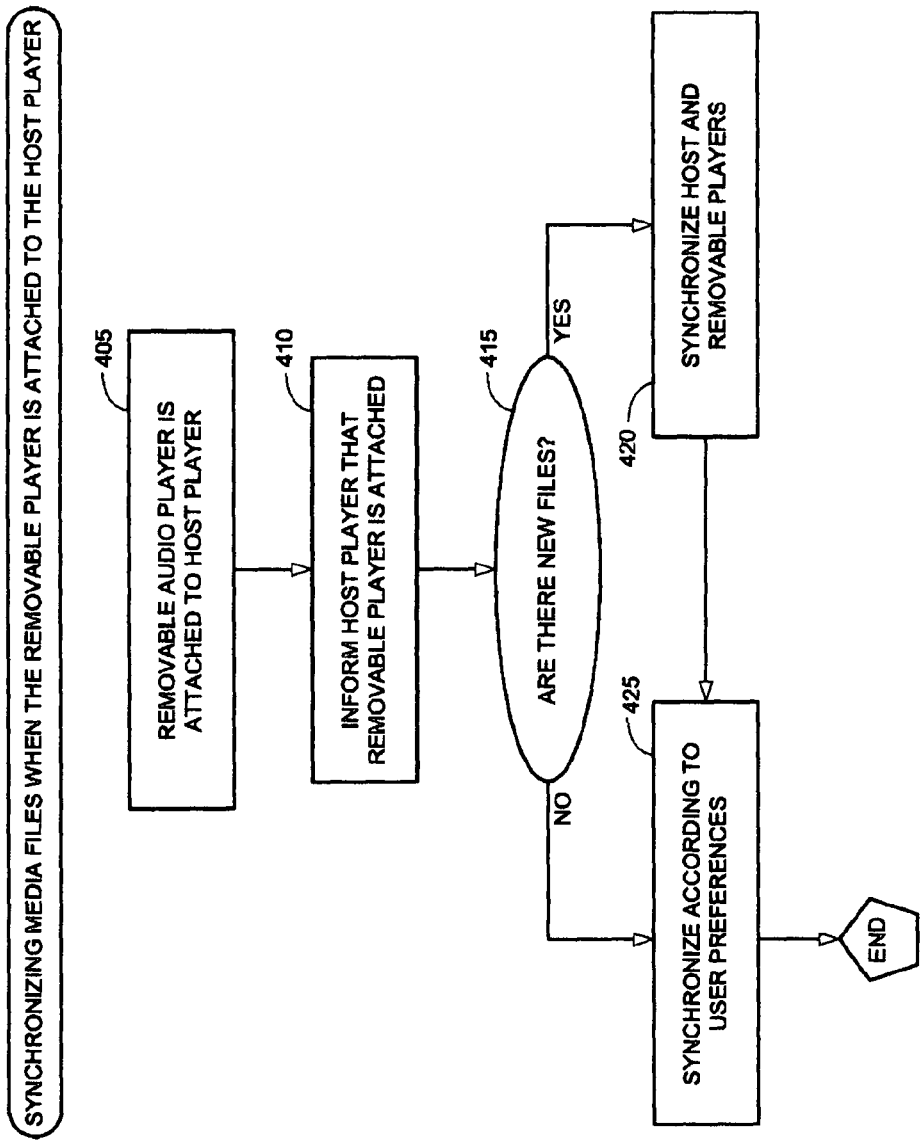
FIG. 4 is a simplified flowchart of operations carried out when a removable audio player is attached to a host media player, in accordance with an embodiment of the present invention.

Reference is now made to FIG. 4, which is a simplified flowchart of operations carried out when removable audio player 110 is attached to host media player 100, in accordance with an embodiment of the present invention. At step 405 removable audio player 110 is attached to host media player 100. When the two players are attached, host player 100 receives a corresponding interrupt, and is thus informed of the attachment at step 410. Such interrupt may be implemented as an SDIO interrupt on the SD bus, or via a dedicated signal.

At step 415, memories 112 and 130 are searched and a determination is made whether there are new media files in one or both of the memories. If so, then at step 420 the host player and removable player are synchronized in accordance with FIGS. 2 and 3. Specifically, steps 220-250 are performed to copy new files from memory 112 to memory 130, and steps 320-335 are performed to copy new files from memory 130 to memory 112.

Processing then proceeds to step 425, whereat the players are synchronized according to predefined user preferences. User preferences may indicate, for example, that all audio files are synchronized, subject to memory availability; or that audio files most often or more frequently listened to are synchronized, subject to memory availability; or that audio files with high user ratings are synchronized, subject to memory availability.

If there are no new media files in memories 112 and 130, as determined at step 415, the processing proceeds directly to step 425. After step 425, the synchronization ends.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A media player, comprising:
a host player, comprising:
a host media playing module for playing digital media files;
a host storage unit for storing digital media files;
a host controller for storing digital media files in said host storage unit; and
at least one host user interface control for user command input to navigate and play the digital media files stored in said host storage unit; and
a removable player which can be attached to said host player and detached from said host player, and which is operative to play digital audio files if it is detached from said host player, comprising:
an audio playing module;
a storage unit for storing digital media files;
a wireless modem for receiving digital media files from remote sources; and
a controller for storing incoming digital media files in said removable player storage unit, and for selectively copying digital media files from said removable player storage unit to said host storage unit in response to detecting that said removable player is attached to said host player,
wherein said host controller selectively copies digital media files from said host storage unit to said removable player storage unit in response to detecting that said removable player is attached to said host player, and
wherein said host media playing module is not operative to play the digital media files stored in said host storage unit if said removable player is detached from said host player.

2. The media player of claim 1 wherein said host storage unit comprises flash memory.

3. The media player of claim 1 wherein said host storage unit comprises a hard disk.

4. The media player of claim 1 wherein said removable player storage unit comprises NAND flash memory.

5. The media player of claim 1 wherein said removable player wireless modem comprises a cellular modem.

6. The media player of claim 1 wherein said removable player wireless modem comprises a WLAN modem.

7. The media player of claim 1 wherein said removable player wireless modem comprises a WiMax modem.

8. The media player of claim 1 wherein said host player is a multimedia player that plays audio and video.

9. The media player of claim 1 wherein said removable player is an audio player.

10. The media player of claim 1 wherein said host player further comprises an external USB connector.

11. The media player of claim 1 wherein said host player further comprises an SD connector.

12. The media player of claim 1 wherein said host player further comprises a host wireless modem.

* * * * *